US008357035B2

(12) United States Patent
Burke et al.

(10) Patent No.: US 8,357,035 B2

(45) Date of Patent: Jan. 22, 2013

(54) THEME RESERVATIONS IN A NETWORK WAGERING GAME ENVIRONMENT

(75) Inventors: Mary M. Burke, Somonauk, IL (US); Jeff Allen, Naperville, IL (US); Vernon W. Hamlin, Lisle, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/129,853

(22) PCT Filed: Nov. 18, 2009

(86) PCT No.: PCT/US2009/006192

§ 371 (c)(1),
(2), (4) Date: May 18, 2011

(87) PCT Pub. No.: WO2010/059212

PCT Pub. Date: May 27, 2010

(65) Prior Publication Data

US 2011/0223990 A1 Sep. 15, 2011

Related U.S. Application Data

(60) Provisional application No. 61/115,541, filed on Nov. 18, 2008.

(51) Int. Cl.
*A63F 13/00* (2006.01)

(52) U.S. Cl. ........................................... 463/25; 463/42

(58) Field of Classification Search .................... 463/16, 463/20-25, 40-43
See application file for complete search history.

(56) References Cited

U.S. PATENT DOCUMENTS

| | | | | | |
|---|---|---|---|---|---|
| 5,429,361 | A * | 7/1995 | Raven et al. | .................... | 463/25 |
| 7,022,017 | B1 * | 4/2006 | Halbritter et al. | ............... | 463/42 |
| 8,087,988 | B2 * | 1/2012 | Nguyen et al. | .................. | 463/17 |
| 2005/0130728 | A1 * | 6/2005 | Nguyen et al. | .................. | 463/16 |
| 2005/0221882 | A1 * | 10/2005 | Nguyen et al. | .................. | 463/16 |
| 2006/0035707 | A1 * | 2/2006 | Nguyen et al. | .................. | 463/29 |
| 2006/0111168 | A1 * | 5/2006 | Nguyen et al. | .................. | 463/16 |
| 2008/0039193 | A1 | 2/2008 | Muir et al. | | |
| 2008/0076570 | A1 | 3/2008 | Johnson | | |
| 2009/0104963 | A1 * | 4/2009 | Burman et al. | ................. | 463/18 |

FOREIGN PATENT DOCUMENTS

| | | | |
|---|---|---|---|
| WO | WO-2007032888 | A1 | 3/2007 |
| WO | WO-2010059212 | A1 | 5/2010 |

OTHER PUBLICATIONS

"International Application Serial No. PCT/US2009/006192, Search Report mailed Jan. 20, 2010", 4 Pgs.

"International Application Serial No. PCT/US2009/006192, Written Opinion mailed Jan. 20, 2010", 8 Pgs.

* cited by examiner

*Primary Examiner* — Masud Ahmed

(74) *Attorney, Agent, or Firm* — Schwegman Lundberg & Woessner, P.A.

(57) ABSTRACT

Systems and methods provide for reserving wagering game themes in a network of wagering games.

20 Claims, 12 Drawing Sheets

302

304

*Fig. 12*
DEMO
THEME RESERVED
Please Enter Reservation
Information
WILD
Play 3000 Credits
CREDITS
10000
TOTAL BET
30
WIN
COLLECT
PAYS/
HELP
LINES
CHANGE/DENOM
BET PER
LINE
Restart

1202

PLEASE SELECT A GAME:

ZEUS
JEWELS OF THE NIGHT
RIVER BELLE
MONOPOLY UP UP AND AWAY
(RESERVATION REQUIRED)
WIZARD OF OZ
(RESERVATION REQUIRED)

1204

THEME RESERVATIONS IN A NETWORK WAGERING GAME ENVIRONMENT

RELATED APPLICATION APPLICATIONS

This application is a U.S. National Stage Filing under 35 U.S.C. 371 from International Application No. PCT/US2009/006192, filed Nov. 18, 2009 and published in English as WO 2010/059212 on May 27, 2010, and claims the priority benefit of U.S. Provisional Application Ser. No. 61/115,541, filed Nov. 18, 2008, the contents of which are incorporated herein by reference in their entireties.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

FIELD

Embodiments of the inventive subject matter relate generally to wagering game systems, and more particularly, to reserving themes in a network of wagering game systems.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering gaming content. In order to maintain player interest, wagering game machine makers frequently update wagering game content with new game themes, game settings, bonus events, game software, and other electronic data.

The theme of a wagering game can have a significant impact on the desirability of a wagering game. For example, a wagering game theme based on a popular movie may experience higher demand due to the theme. However, wagering game establishments may have a limited number of licenses for a wagering game incorporating a particular theme. As a result, not all players desiring to use a wagering game with a popular theme may be able to be accommodated.

BRIEF DESCRIPTION OF THE FIGURES

Embodiments of the invention are illustrated by way of example and not limitation in the Figures of the accompanying drawings in which.

DESCRIPTION OF THE EMBODIMENTS

In general, the embodiments of the inventive subject matter provide systems and methods for reserving wagering game themes in a networked gaming establishment. As used herein, reserving a wagering game theme refers to a reservation for an executable instance of a wagering game having a particular theme. Reserving a wagering game theme may also refer to reserving a license seat for a wagering game having the licensed theme.

Example Wagering Game Machines

Example Wagering Game Machine

Figure 1:
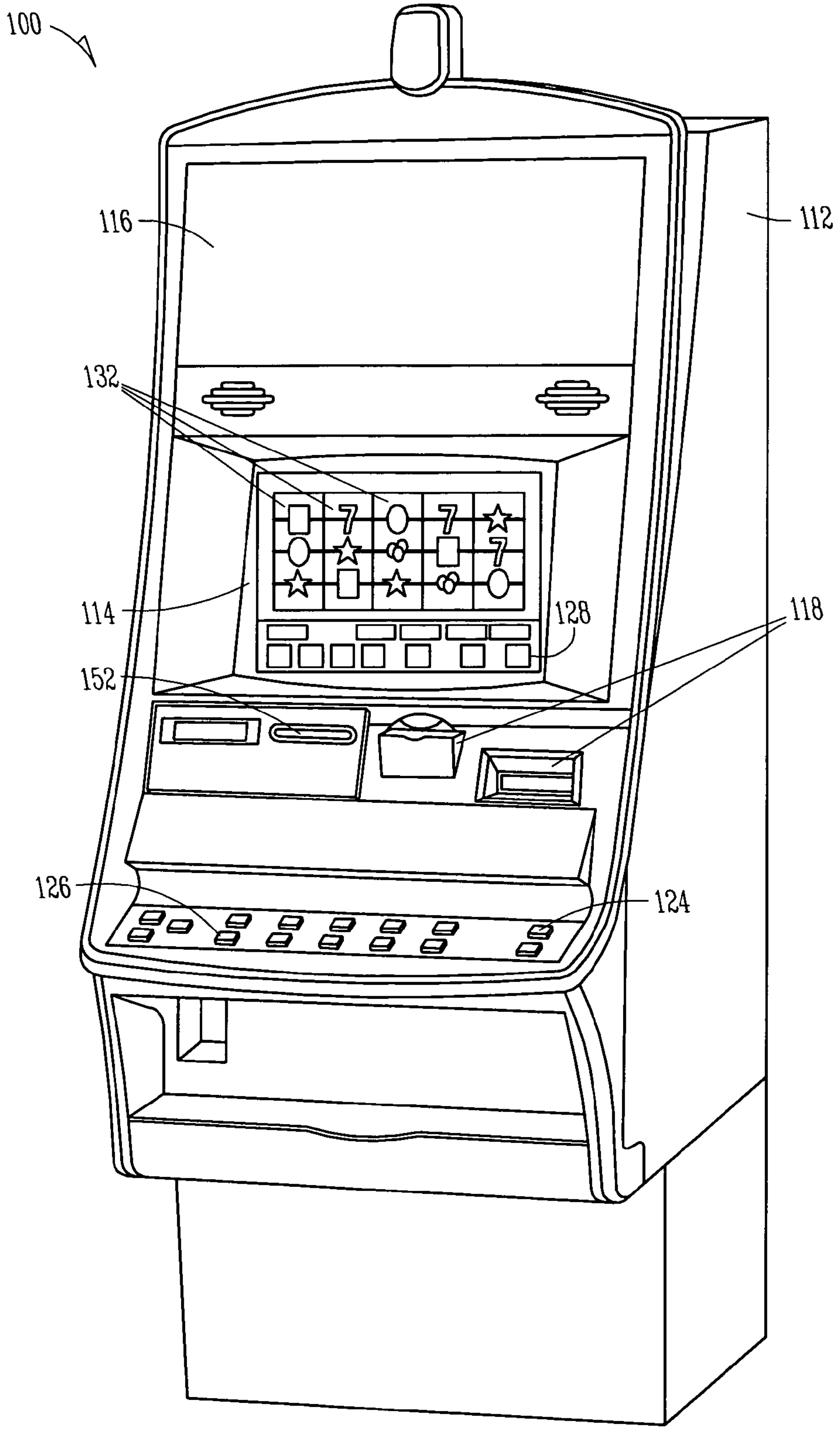
FIG. 1 is a perspective view of a wagering game machine, according to example embodiments of the invention.

FIG. 1 is a perspective view of a wagering game machine, according to example embodiments of the invention. Referring to FIG. 1, a wagering game machine 100 is used in gaming establishments, such as casinos. According to embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game machine 100 comprises a housing 112 and includes input devices, including value input devices 118 and a player input device 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The value input devices 118 can take any suitable form and can be located on the front of the housing 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, cards, or other tangible portable storage devices. The vouchers or cards can authorize access to central accounts, which can transfer money to the wagering game machine 100.

The player input device 124 comprises a plurality of push buttons on a button panel 126 for operating the wagering game machine 100. In addition, or alternatively, the player input device 124 can comprise a touch screen 128 mounted over the primary display 114 and/or secondary display 116.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model, or workstation console model.

A player begins playing a basic wagering game by making a wager via the value input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 can also include an information reader 152, which can include a card reader, ticket reader, bar code scanner, RFID transceiver, or computer readable storage medium interface. In some embodiments, the information reader 152 can be used to award complimentary services, restore game assets, track player habits, etc.

Example Handheld Wagering Game Machine

Figure 2:
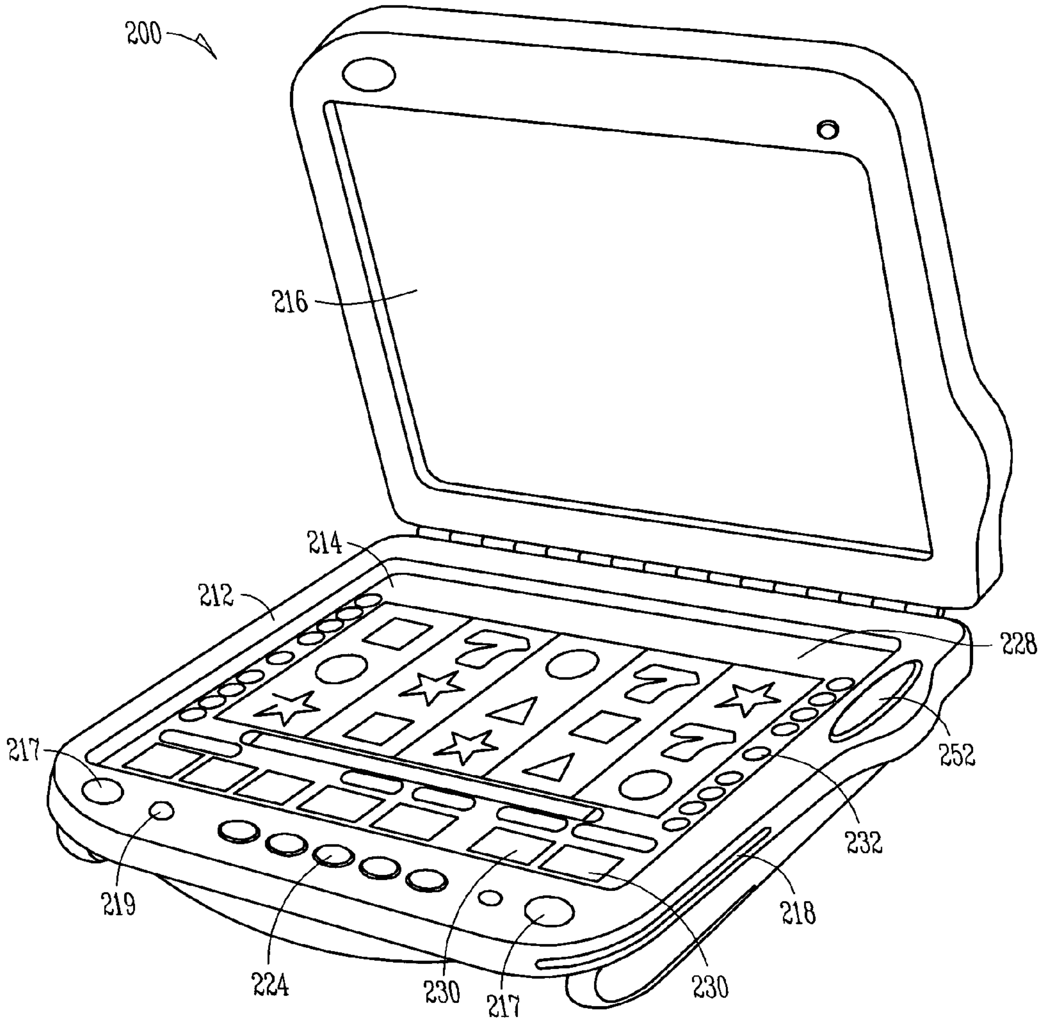
FIG. 2 is a perspective view of a portable wagering game machine, according to example embodiments of the invention.

FIG. 2 shows an example embodiment of a wagering game machine 200. Like free standing wagering game machines, in a handheld or mobile form, the wagering game machine 200 can include any suitable electronic device configured to play a video casino games such as blackjack, slots, keno, poker, blackjack, and roulette. The wagering game machine 200 comprises a housing 212 and includes input devices, including a value input device 218 and a player input device 224. For output, the wagering game machine 200 includes a primary display 214, a secondary display 216, one or more speakers 217, one or more player-accessible ports 219 (e.g., an audio output jack for headphones, a video headset jack, etc.), and other conventional I/O devices and ports, which may or may not be player-accessible. In the embodiment depicted in FIG. 2, the wagering game machine 200 comprises a secondary display 216 that is rotatable relative to the primary display 214. The optional secondary display 216 can be fixed, movable, and/or detachable/attachable relative to the primary display 214. Either the primary display 214 and/or secondary display 216 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 218 can comprise, for example, a slot located on the front, side, or top of the housing 212 configured to receive credit from a stored-value card (e.g., casino card, smart card, debit card, credit card, etc.) inserted by a player. The player-accessible value input device 218 can also comprise a sensor (e.g., an RF sensor) configured to sense a signal (e.g., an RF signal) output by a transmitter (e.g., an RF transmitter) carried by a player. The player-accessible value input device 218 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 200.

Still other player-accessible value input devices 218 can require the use of touch keys 230 on the touch-screen display (e.g., primary display 214 and/or secondary display 216) or player input devices 224. Upon entry of player identification information and, preferably, secondary authorization information (e.g., a password, PIN number, stored value card number, predefined key sequences, etc.), the player can be permitted to access a player's account. As one potential optional security feature, the wagering game machine 200 can be configured to permit a player to only access an account the player has specifically set up for the wagering game machine 200. Other conventional security features can also be utilized to, for example, prevent unauthorized access to a player's account, to minimize an impact of any unauthorized access to a player's account, or to prevent unauthorized access to any personal information or funds temporarily stored on the wagering game machine 200.

The player-accessible value input device 218 can itself comprise or utilize a biometric player information reader which permits the player to access available funds on a player's account, either alone or in combination with another of the aforementioned player-accessible value input devices 218. In an embodiment wherein the player-accessible value input device 218 comprises a biometric player information reader, transactions such as an input of value to the wagering game machine 200, a transfer of value from one player account or source to an account associated with the wagering game machine 200, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 218 comprising a biometric player information reader can require a confirmatory entry from another biometric player information reader 252, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 218 can be provided remotely from the wagering game machine 200.

The player input device 224 comprises a plurality of push buttons on a button panel for operating the wagering game machine 200. In addition, or alternatively, the player input device 224 can comprise a touch screen mounted to a primary display 214 and/or secondary display 216. In one aspect, the touch screen is matched to a display screen having one or more selectable touch keys 230 selectable by a user's touching of the associated area of the screen using a finger or a tool, such as a stylus pointer. A player enables a desired function either by touching the touch screen at an appropriate touch key 230 or by pressing an appropriate push button on the button panel. The touch keys 230 can be used to implement the same functions as push buttons. Alternatively, the push buttons 232, can provide inputs for one aspect of the operating the game, while the touch keys 230 can allow for input needed for another aspect of the game. The various components of the wagering game machine 200 can be connected directly to, or contained within, the housing 212, as seen in FIG. 2, or can be located outside the housing 212 and connected to the housing 212 via a variety of wired (tethered) or wireless connection methods. Thus, the wagering game machine 200 can comprise a single unit or a plurality of interconnected (e.g., wireless connections) parts which can be arranged to suit a player's preferences.

The operation of the basic wagering game on the wagering game machine 200 is displayed to the player on the primary display 214. The primary display 214 can also display the bonus game associated with the basic wagering game. The primary display 214 preferably takes the form of a high resolution LCD, a plasma display, an LED, or any other type of display suitable for use in the wagering game machine 200. The size of the primary display 214 can vary from, for example, about a 2-3" display to a 15" or 17" display. In at least some embodiments, the primary display 214 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 214 and/or secondary display 216 can have a 16:9 aspect ratio or other aspect ratio (e.g., 4:3). The primary display 214 and/or secondary display 216 can also each have different resolutions, different color schemes, and different aspect ratios.

As with the free standing embodiments a wagering gaming machine, a player begins play of the basic wagering game on the wagering game machine 200 by making a wager (e.g., via the value input device 418 or an assignment of credits stored on the handheld gaming machine via the touch screen keys 230, player input device 224, or buttons 232) on the wagering game machine 200. In some embodiments, the basic game can comprise a plurality of symbols arranged in an array, and includes at least one payline 228 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 218 of the wagering game machine 200 can double as a player information reader 252 that allows for identification of a player by reading a card with information indicating the player's identity (e.g., reading a player's credit card, player ID card, smart card, etc.). The player information reader 252 can alternatively or also comprise a bar code scanner, RFID transceiver or computer readable storage medium interface. In one embodiment, the player information reader 252 comprises a biometric sensing device.

Wagering games executing on wagering game machines 100 and 200 typically have a theme associated with the wagering game. The theme for a wagering game can be expressed on the symbols used in the wagering game. For example, reel symbols, cards, dice, etc. may have images based on the theme for the wagering game. Further, bonus games associated with the wagering game may be based on the theme for the wagering game. In addition, audio, video and still images presented on the wagering game may be associated with the theme.

Figure 3:
FIG. 3 provides examples of themes for wagering games executing on wagering game machines incorporating embodiments of the invention.
Figure 3:
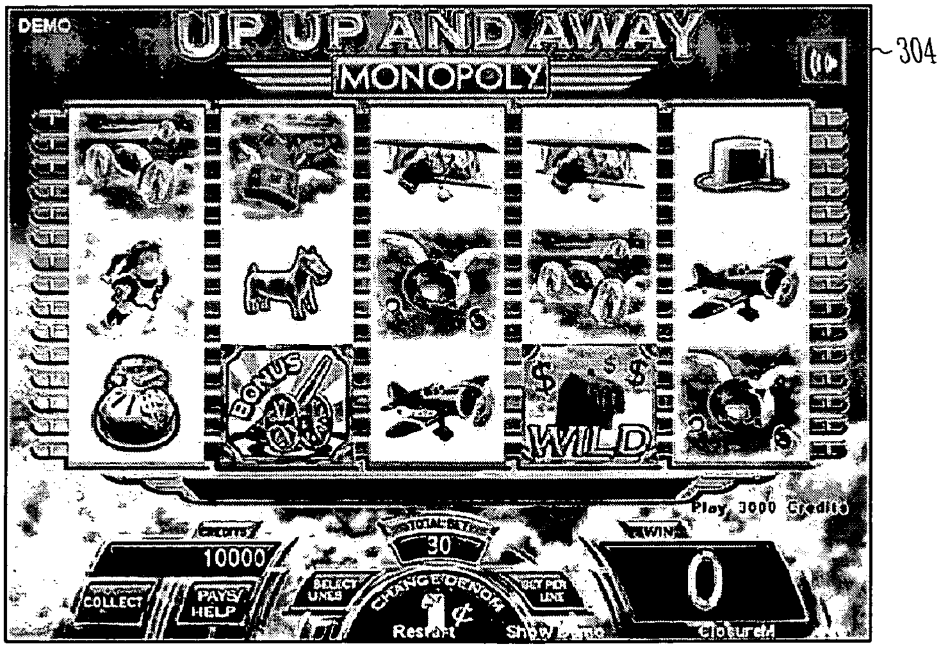

FIG. 3 provides examples of themes for wagering games executing on wagering game machines incorporating embodiments of the invention. Example screen 302 illustrates a "Wizard of Oz" theme for a wagering game. The symbols on the video reels in the example screen incorporate various elements from the film "Wizard of Oz."

Example screen 304 illustrates a MONOPOLY™ themed wagering game. The video reels in example screen 304 incorporate elements based on the board game "MONOPOLY."

Example Wagering Game Network

Figure 4:
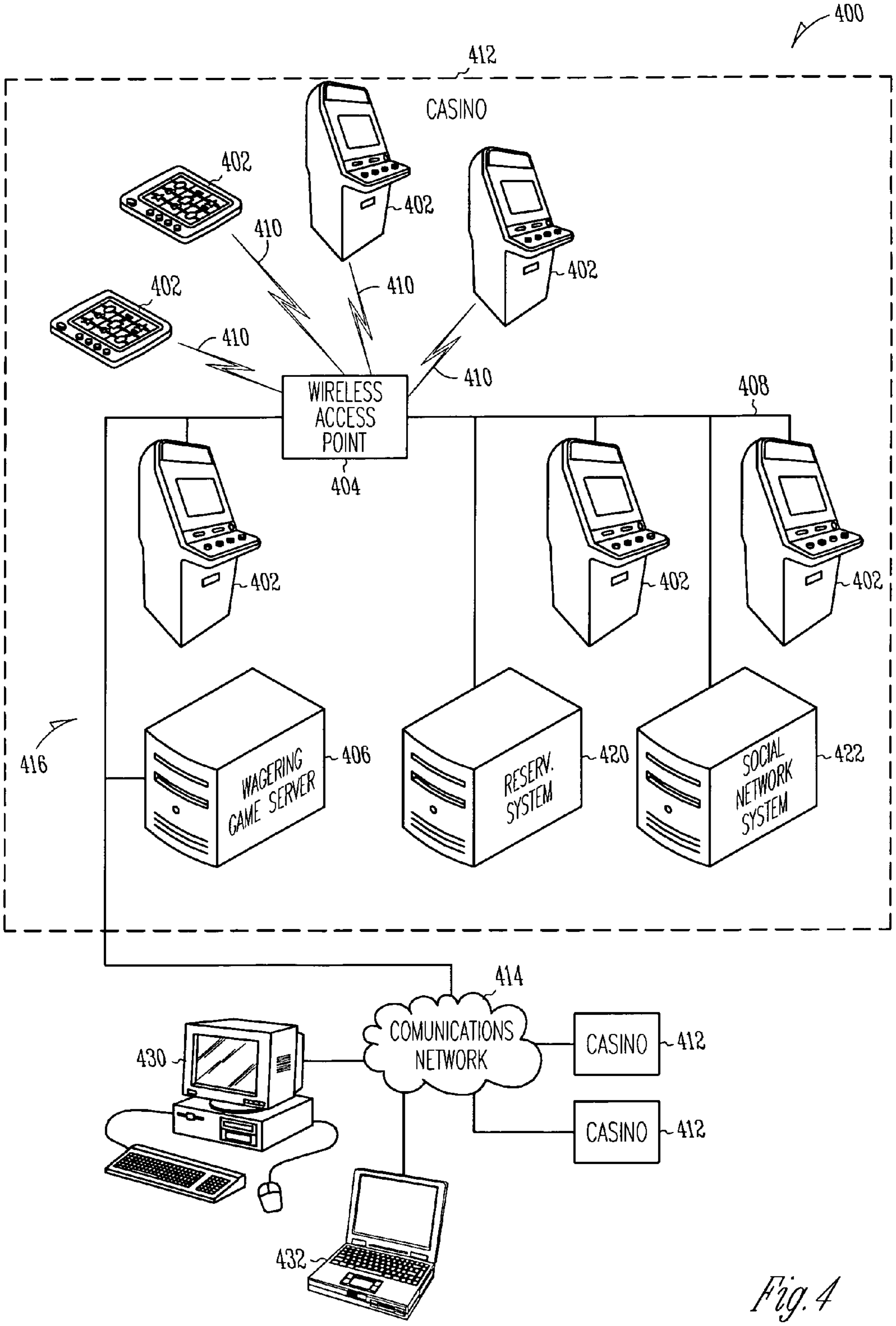
FIG. 4 is a block diagram illustrating a wagering game network, according to example embodiments of the invention.

FIG. 4 is a block diagram illustrating a wagering game network 400, according to example embodiments of the invention. As shown in FIG. 4, the wagering game network 400 includes a plurality of casinos 412 connected to a communications network 414.

Each of the plurality of casinos 412 includes a local area network 416, which may include a wireless access point 404, wagering game machines 402, and a wagering game server 406 that can serve wagering games over the local area network 416. In addition, a casino may include a reservation server 420 and a social networking server 422 also coupled to network 416. In some embodiments, the local area network 416 includes wireless communication links 410 and wired communication links 408. The wired and wireless communication links can employ any suitable connection technology, such as Bluetooth, 802.11, Ethernet, public switched telephone networks, SONET, etc. In one embodiment, the wagering game server 406 can serve wagering games and/or distribute content to devices located in other casinos 412 or at other locations on the communications network 414.

As noted above, the wagering game machines 402 may present wagering games having a particular theme. Reservation server 420 maintains reservations for various theme based wagering games. In some embodiments, a user may reserve a wagering game having a particular theme for play at a particular time. Reservation server 420 responds to reservation requests and maintains data regarding the various reservations. Further details on the operation of a reservation system 420 are provided below.

Social network server 422 provides a wagering game related social networking environment, including blogs, chat rooms, instant messaging capabilities, email and other components typical for a social networking environment. Users may register with the social networking server and provide commentary on user experiences with various aspects of wagering and wagering games.

It should be noted that although systems and servers 406, 420 and 422 are illustrated as separate entities in FIG. 4, the services they provide may reside on the same server or computer or may be distributed among any number of machines in the gaming network 416.

The wagering game machines 402 and wagering game server 406 can include hardware and machine-readable media including instructions for performing the operations described herein.

The wagering game machines 402 described herein can take any suitable form, such as floor standing models, handheld mobile units, bartop models, workstation-type console models, etc. Further, the wagering game machines 402 can be primarily dedicated for use in conducting wagering games, or can include non-dedicated devices, such as mobile phones, personal digital assistants, personal computers, etc. In one embodiment, the wagering game network 400 can include other network devices, such as accounting servers, wide area progressive servers, player tracking servers, and/or other devices suitable for use in connection with embodiments of the invention.

In various embodiments, wagering game machines 402 and wagering game servers 406 work together such that a wagering game machine 402 may be operated as a thin, thick, or intermediate client. For example, one or more elements of game play may be controlled by the wagering game machine 402 (client) or the wagering game server 406 (server). Game play elements may include executable game code, lookup tables, configuration files, game outcome, audio or visual representations of the game, game assets or the like. In a thin-client example, the wagering game server 406 may perform functions such as determining game outcome or managing assets, while the wagering game machine 402 may be used merely to present the graphical representation of such outcome or asset modification to the user (e.g., player). In a thick-client example, game outcome may be determined locally (e.g., at the wagering game machine 402) and then communicated to the wagering game server 406 for recording or managing a player's account.

Similarly, functionality not directly related to game play may be controlled by the wagering game machine 402 (client) or the wagering game server 406 (server) in embodiments. For example, power conservation controls that manage a display screen's light intensity may be managed centrally (e.g., by the wagering game server 406) or locally (e.g., by the wagering game machine 402). Other functionality not directly related to game play may include presentation of advertising, software or firmware updates, system quality or security checks, etc.

Computers 430 and 432 are systems that may be used to place reservation requests that are maintained by reservation system 420. Computers 430 and 432 may be located at a player's home, hotel room or any other location that can communicate over network 414 to the reservation system 420. Further, computers 430 or 432 may be personal computers, laptop computers, cell phones, personal digital assistants or any other computing device capable of presenting a user interface that may be used to place reservations or to participate in various offerings of the social networking server.

Example Wireless Environment

In some embodiments, the wireless access point 404 can be part of a communication station, such as wireless local area network (WLAN) communication station including a Wireless Fidelity (WiFi) communication station, or a WLAN access point (AP). In these embodiments, the wagering game machines 402 can be part of a mobile station, such as WLAN mobile station or a WiFi mobile station.

In some other embodiments, the wireless access point 404 can be part of a broadband wireless access (BWA) network communication station, such as a Worldwide Interoperability for Microwave Access (WiMax) communication station, as the wireless access point 404 can be part of almost any wireless communication device. In these embodiments, the wagering game machines 402 can be part of a BWA network communication station, such as a WiMax communication station.

In some embodiments, any of the wagering game machines 402 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the wireless access point 404 and the wagering game machines 402 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 404 and the wagering game machines 402 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"-Local Area Networks-Specific Requirements-Part 11 "Wireless LAN Medium Access Control (MAC) and Physical Layer (PHY), ISO/IEC 8802-11: 1999", and Metropolitan Area Networks-Specific Requirements—Part 16: "Air Interface for Fixed Broadband Wireless Access Systems," Can 2005 and related amendments/versions.

In other embodiments, the wireless access point 404 and the wagering game machines 402 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 404 and the wagering game machines 402 can communicate in accordance with an ultra-wideband (UWB) communication technique where a carrier frequency is not used. In other embodiments, the wireless access point 404 and the wagering game machines 402 can communicate in accordance with an analog communication technique. In other embodiments, the wireless access point 404 and the wagering game machines 402 can communicate in accordance with an optical communication technique, such as the Infrared Data Association (IrDA) standard. In some embodiments, the wireless access point 404 and the wagering game machines 402 can communicate in accordance with the Home-RF standard which can be in accordance with a Home-RF Working Group (HRFWG) standard.

Example Operating Environment

Example Wagering Game Machine Architecture

Figure 5:
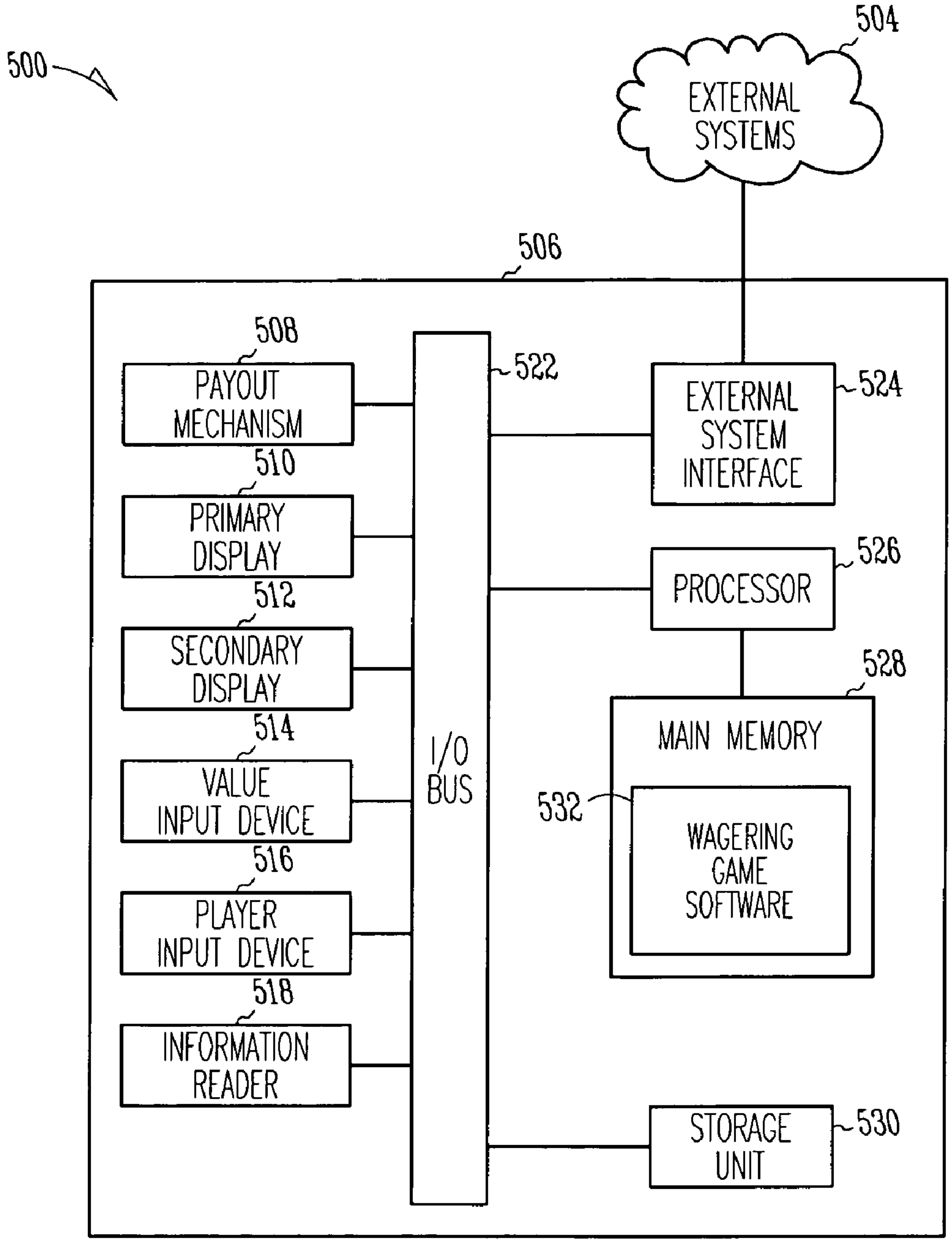
FIG. 5 is a block diagram illustrating a wagering game machine architecture, including a control system, according to example embodiments of the invention.

FIG. 5 is a block diagram illustrating a wagering game machine architecture, including a control system, according to example embodiments of the invention. As shown in FIG. 5, the wagering game machine 506 includes a processor 526 connected to main memory 528, which includes wagering game software 532. In one embodiment, the wagering game presentation software 532 can present wagering games, such as video poker, video black jack, video slots, video lottery, etc., in whole or part. Further, the wagering game software 532 may include modules that are used to honor reservations for wagering games having a theme that has been reserved.

The processor 526 is also connected to an input/output (I/O) bus 522, which facilitates communication between the wagering game machine's components. The I/O bus 522 is connected to a payout mechanism 508, primary display 510, secondary display 512, value input device 514, player input device 516, information reader 518, and storage unit 530. The player input device 516 can include the value input device 514 to the extent the player input device 516 is used to place wagers. The I/O bus 522 is also connected to an external system interface 524, which is connected to external systems 504 (e.g., wagering game networks).

In one embodiment, the wagering game machine 506 can include additional peripheral devices and/or more than one of each component shown in FIG. 5. For example, in one embodiment, the wagering game machine 506 can include multiple external system interfaces 524 and multiple processors 526. In one embodiment, any of the components can be integrated or subdivided. Additionally, in one embodiment, the components of the wagering game machine 506 can be interconnected according to any suitable interconnection architecture (e.g., directly connected, hypercube, etc.).

In one embodiment, any of the components of the wagering game machine 506 can include hardware, firmware, and/or software for performing the operations described herein. Machine-readable media includes any mechanism that provides (e.g., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, or any other form of memory now known or developed in the future that can store instructions and data, either persistently or while power is supplied to the machine-readable media. Machine-readable media also includes any media suitable for transmitting or receiving software over a network.

Figure 6:
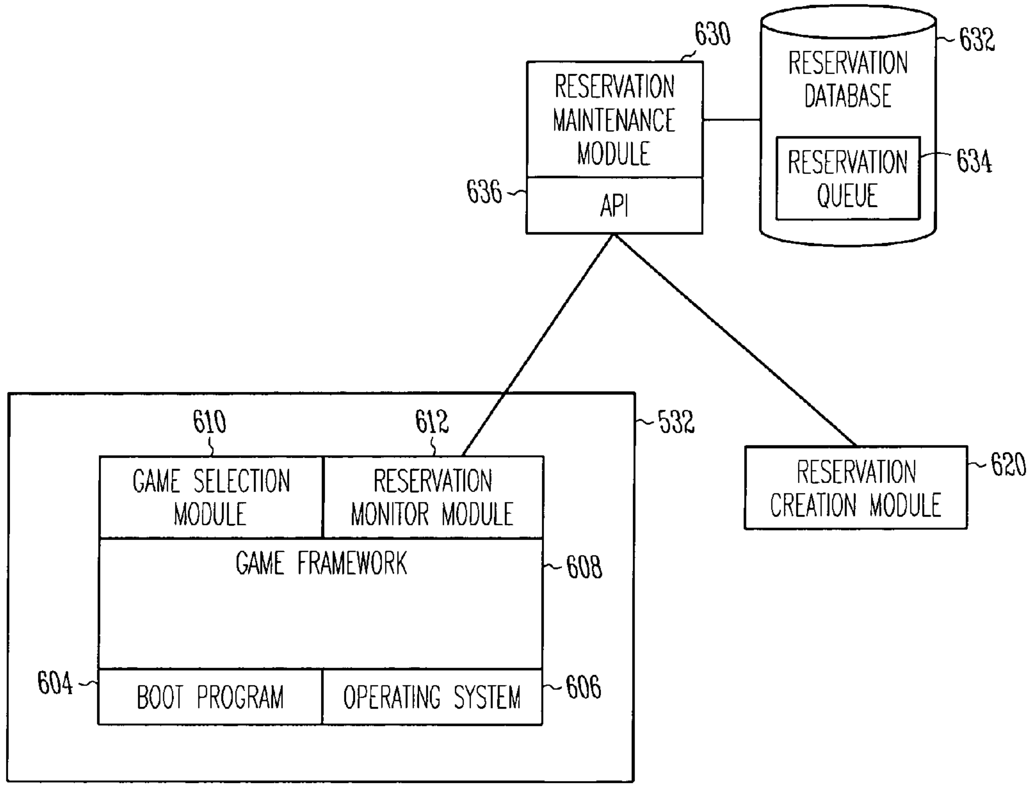
FIG. 6 is a block diagram illustrating various modules of an architecture for a wagering game reservation system, according to example embodiments of the invention.

FIG. 6 is a block diagram illustrating various modules of an architecture for a wagering game reservation system 600, according to example embodiments of the inventive subject matter. As shown in FIG. 6, the wagering game architecture 600 includes wagering game machine software 532, a reservation creation module 620, and reservation maintenance module 630.

Reservation creation module 620 provides an interface for creating reservations for wagering games having various themes. The reservation creation module presents a user interface that allows a user on a computer to reserve a wagering game having a desired theme for a particular date and time. In some embodiments, the user interface is a web-based interface that may be executed on a user's computer, a wagering game machine, or other computing device (e.g., a PDA, cell phone, etc.). In alternative embodiments, the reservation creation module may execute on a wagering game machine and allow a user at the wagering game machine to reserve a wagering game having a desired theme. In further alternative embodiments, the reservation creation module 620 may execute at a kiosk within a casino. In still further alternative embodiments, reservation creation module 620 may execute on an AOM (Administrative, Operations and Maintenance) workstation within a casino.

Reservation maintenance module 630 can execute on a reservation system 420 and operate to respond to requests to reserve wagering game themes. The reservation maintenance module 630 can maintain data related to pending reservations in a reservation database 632. In some embodiments, the reservation database may maintain a queue of reservations 634. The queue 634 may be a FIFO (First In First Out). Alternatively, the position of reservation entries in the queue 634 may be adjusted according to various parameters as discussed below. In addition, reservation database 632 may maintain data about reservations. Such data may include an identification of the wagering game theme being reserved, a reservation date and time, a reservation duration (either a time period or an ending date and time of the reservation) an identification of the party and/or loyalty status of the party holding the reservation etc. As reservations expire, the expired reservations can be removed from database 632.

In some embodiments, reservation maintenance module 630 provides an API (Application Program Interface) 636 that may be used by internal and external entities such as third party software developers to interface with the reservation maintenance module to create, maintain and query wagering game theme reservations.

Wagering game software 532, in some embodiments, includes a boot program 604, an operating system 606, a game framework 608 that presents a wagering game, and a reservation monitor module 612. In various embodiments, the hardware platform executing wagering game software 532 may include a thin-client, thick-client, or some intermediate derivation. The hardware platform may also be configured to provide a virtual client. The boot program 604 may include a basic input/output system (BIOS) or other initialization program that works in conjunction with the operation system 606 to provide a software interface to the hardware platform. The game framework 608 may include standardized game software components either independent or in combination with specialized or customized game software components that are designed for a particular wagering game. The customized components may implement a theme for the wagering game. Further, the components may include audio, video, and image data that are used to present theme elements for the wagering game. In one example embodiment, the wagering game framework 608 may include software operative in connection with the hardware platform and operating system 606 to present wagering games, such as video poker, video black jack, video slots, video lottery, etc., in whole or part. Further, the game framework 608 may include software operative to accept a wager from a player. According to another example embodiment, one or more of the components of game framework 608 may be provided as part of the operating system 606 or other software used in the wagering game system 600 (e.g., libraries, daemons, common services, etc.).

Reservation monitor module 612 operates on a wagering game machine and provides an interface to control access to wagering game themes that are subject to reservations. In some embodiments, reservation monitor module 612 determines if a reservation is required for a wagering game theme, and provides an interface to make reservations and to allow a user to play a wagering game theme when the themed game is available. In some embodiments, a reservation may be required when the number of unreserved instances of a wagering game has reached a maximum number of concurrent uses. In this case, the monitor module 612 provides an interface that allows a user to make reservations and/or to provide information indicating they hold a current reservation for the wagering game theme before being allowed to play an instance of the wagering game.

In some embodiments, wagering game software 532 includes a game selection module 610. Game selection module 610 provides an interface allowing selection of a wagering game from multiple wagering game themes. The interface may indicate which of the themes currently require a reservation. The list may be dynamically updated as instances or license seaths of a theme are used, freed up or otherwise made available (e.g., obtaining additional licenses).

Further details on the operation of the above systems and components are provided below with reference to FIGS. 7-12.

Example Operations

Figure 7:
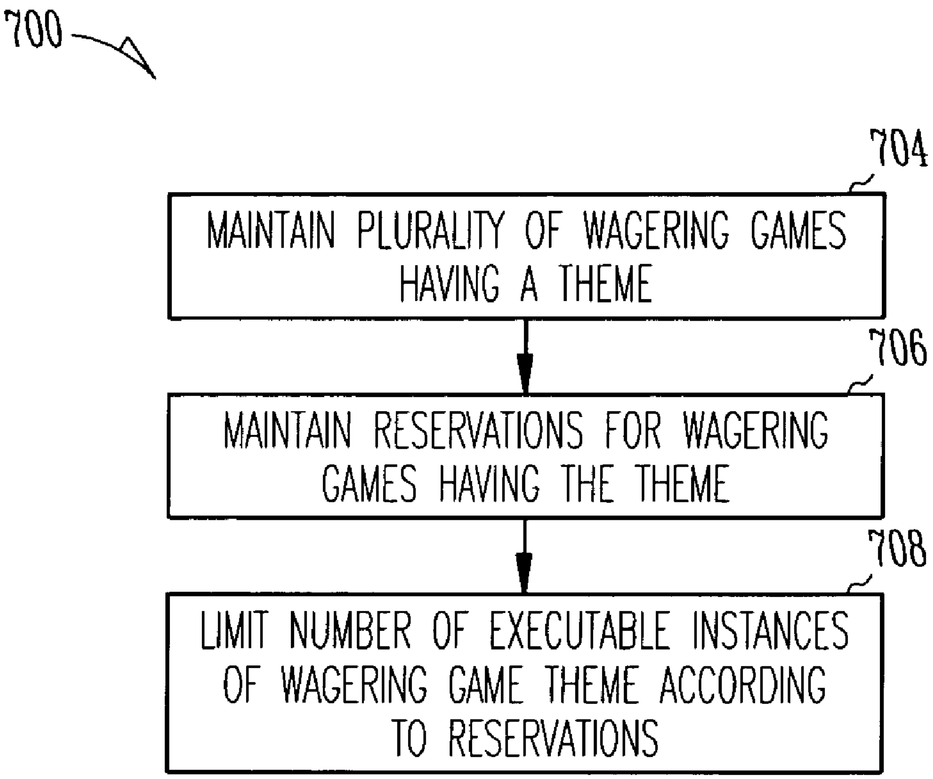
FIG. 7 is a flowchart illustrating a method for providing reservations of wagering game themes according to embodiments of the invention.

FIG. 7 is a flowchart illustrating a method 700 for providing reservations of wagering game themes according to embodiments of the invention. The method begins at block 702 by maintaining a plurality of wagering games having a theme. The wagering games may be maintained in any of a number of ways. For example, the wagering games may be maintained in a memory such as a RAM, compact flash or hard drive of a wagering game machine. Alternatively, the wagering games may be maintained on a server and downloaded to, or accessed by, wagering game machines. The download may take place on demand, i.e., when the wagering game is accessed, or the download may take place prior to any user's request for the wagering game. Typically there is a maximum number of instances of a wagering game that may be executing at any one time. This maximum number may be determined by license terms, and may be enforced by a license manager or by a wagering game server. The maximum number may also be dictated by the number of physical copies of the wagering game that exist in a memory.

At block 704, the system maintains reservations for the wagering game theme. A reservation may be established in any of a number of ways. For example, in some embodiments, a reservation may be created on a wagering game machine when a theme is not available for immediate play. The reservation may be placed in a queue and the user notified when the wagering game is available.

In alternative embodiments, a user interface is provided that allows a user to make a reservation for a future date and time for a wagering game theme. The user interface may be web-based and allow a user to make a reservation prior to arriving at a wagering establishment. For example, the user may make a reservation from home, from a hotel room, or in any other location where network access to a reservation maintenance system is available. In some embodiments, the user may need to meet certain conditions in order to make a reservation of a wagering game theme. For example, the user may need to have achieved a certain loyalty status that may be tracked by a player tracking system.

In alternative embodiments, a system administrator may create reservations based on a class or characteristic of a user. For example, a system administrator may reserve a number of instances of wagering games having a particular theme for players classified as "high rollers". Alternatively, a number of instances of wagering games having a particular theme may be reserved for players that have achieved a particular loyalty status (i.e. a "frequent player" status) with a casino.

Further, a number of instances of wagering games having a particular theme may be reserved as part of a "package deal" purchased by a player that may include accommodations, show tickets and a reservation for the wagering game theme.

As reservations are honored or expired, they may be removed from the system.

At block 706 the system limits the number of executable instances of a wagering game theme according to a maximum number (e.g., a maximum number of licenses) and the number of reservations for the time. Thus in some embodiments, the system limits the number of concurrently executing instances of a wagering game theme to the number of licensed copies less the number of pending reservations for the current time period. In some embodiments, an instance of a wagering game theme is considered an executing copy of the wagering game theme. There may be copies of a wagering game that are not considered an instance, because they are stored on disk and not currently executing on a wagering game machine.

As an example of the above, assume that 100 copies of a wagering game theme may be concurrently executing within a gaming establishment. Further assume that 10 instances of the wagering game theme have been reserved to accommodate players that have achieved a "gold" loyalty status and that 5 instances have been reserved by individual players for the current time period. In this case, the system may limit the number of unreserved instances of a wagering game theme to 85 instances in order to assure that up to 10 "gold" level players may play and that the 5 existing user reservations may be honored.

Figure 8:
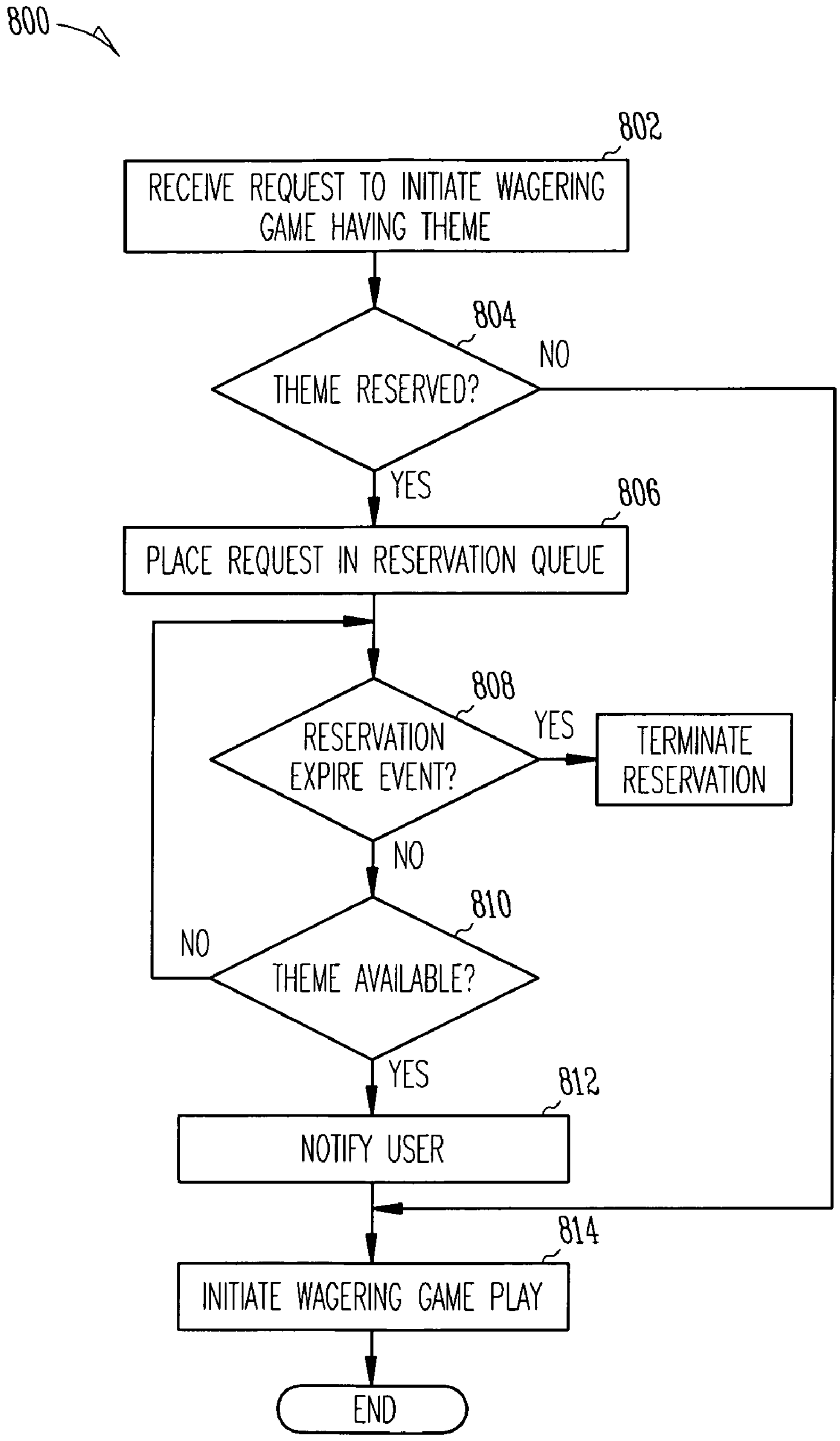
FIG. 8 is a flowchart illustrating a method for reserving a wagering game theme according to embodiments of the invention.

FIG. 8 is a flowchart illustrating a method 800 for fulfilling a reservation according to embodiments of the invention. The method begins at block 802 by receiving a request to initiate a wagering game with a particular theme. At block 804, the wagering game determines if a reservation is required to play the wagering game. A reservation may be required if the system determines that the maximum number of instances of the wagering game theme are currently in use.

If a reservation is not required, flow continues to block 814 with initiation of the wagering game.

Otherwise, if all available instances (or license seats) of a wagering game theme are in use, then at block 806 the system places a reservation for the theme on behalf of the user. The reservation may be placed in a queue of reservations for the wagering game theme. As noted above, in some embodiments, the queue is a FIFO. In alternative embodiments, positions in the queue may be adjusted according to various parameters. For example, players with a high roller status or frequent player status may be placed in the queue ahead of users that are not high rollers or frequent players. The position in the queue may vary depending on whether the player made a reservation ahead of time (see e.g., FIGS. 9-10) or whether the player made in "instant" reservation at the wagering game machine.

In some embodiments, the user may play an alternative themed wagering game at the wagering game machine while waiting for the reserved wagering game theme to become available. Further, in some embodiments, the wagering game machine may download (in the background) the reserved wagering game theme if it is not already on the wagering game machine.

In some embodiments, a visual indicator may be presented to inform the user where they currently reside in the queue. Additionally, a visual indicator may be displayed that provides an indication of when a wagering game reservation wait time may be longer or shorter during a particular time period. This allows the user to gauge whether it is worthwhile waiting for the theme or to come back at another time when a reservation may not be needed or when the wait time is shorter.

At block 808, a check is made to determine if the reservation has expired. Various events can cause a reservation to expire. For example, a reservation for a user that is not identifiable via a player tracking card or identification may expire when the user cashes out and leaves the wagering game machine. Further, the reservation may expire if the user does not maintain a predetermined rate of play, coin-in, or other measurement of game play activity. This is desirable in order to avoid situations where a player "squats" on a machine without engaging in any wagering activity while waiting for their reserved wagering game theme to become available. A reservation may expire if a user removes a player tracking card and does not insert it into another wagering game machine within a predetermined period of time. If the user does insert their player tracking card into another wagering game machine, the reservation may follow the player to the new wagering game machine.

If the reservation expires, the reservation is terminated and the user may be required to re-reserve the wagering game theme.

At block 810, a check is made to see if the wagering game theme has become available. The reserved theme may become available when another user stops playing the wagering game theme. Alternatively, a casino may purchase more license seats on a temporary or permanent basis, thereby making more instances of the wagering game theme available. Availability may depend on the location of the wagering game machine. For example, a player may play a reserved wagering game theme having a "high roller" designation when in a "high roller" area of a casino. If the wagering game theme is not available, then control returns to block 808 to determine if any reservation expiration events have occurred.

If a reserved wagering game theme becomes available, then at block 812 the user is notified of the availability of the wagering game theme. In some embodiments, the user is notified at the end of a play on an alternative wagering game that the user has chosen while waiting for the reserved theme to become available. The notification may comprise a user interface element being displayed on the wagering game machine.

In alternative embodiments, a user may be notified that the reserved wagering game theme is now available for play via a text message or phone call to a cell phone, via a web page, via an email, via a paging device or via some other non-wagering game machine device.

At block 814, the user may play the reserved wagering game theme. In some embodiments, a reserved wagering game theme may be played for a limited amount of time. The time limit may be determined according to a number of factors, including the number of reservations for the wagering game theme currently in the reservation queue, the frequent player status of the user, the amount of available play time for the theme, coin-in, number of spins, amount won, bonus rounds, occupancy of the casino or wagering game theme, spin rate, wagering rate, denomination of the wagering game machine, odds or paytable for the wagering game, etc.

In some embodiments, a time limit may be spread across multiple plays. For example, a player may play a reserved wagering game theme, leave the machine for a certain time (e.g., to go eat or attend a show) and return to use the rest of the allotted time of the reservation.

Figure 9:
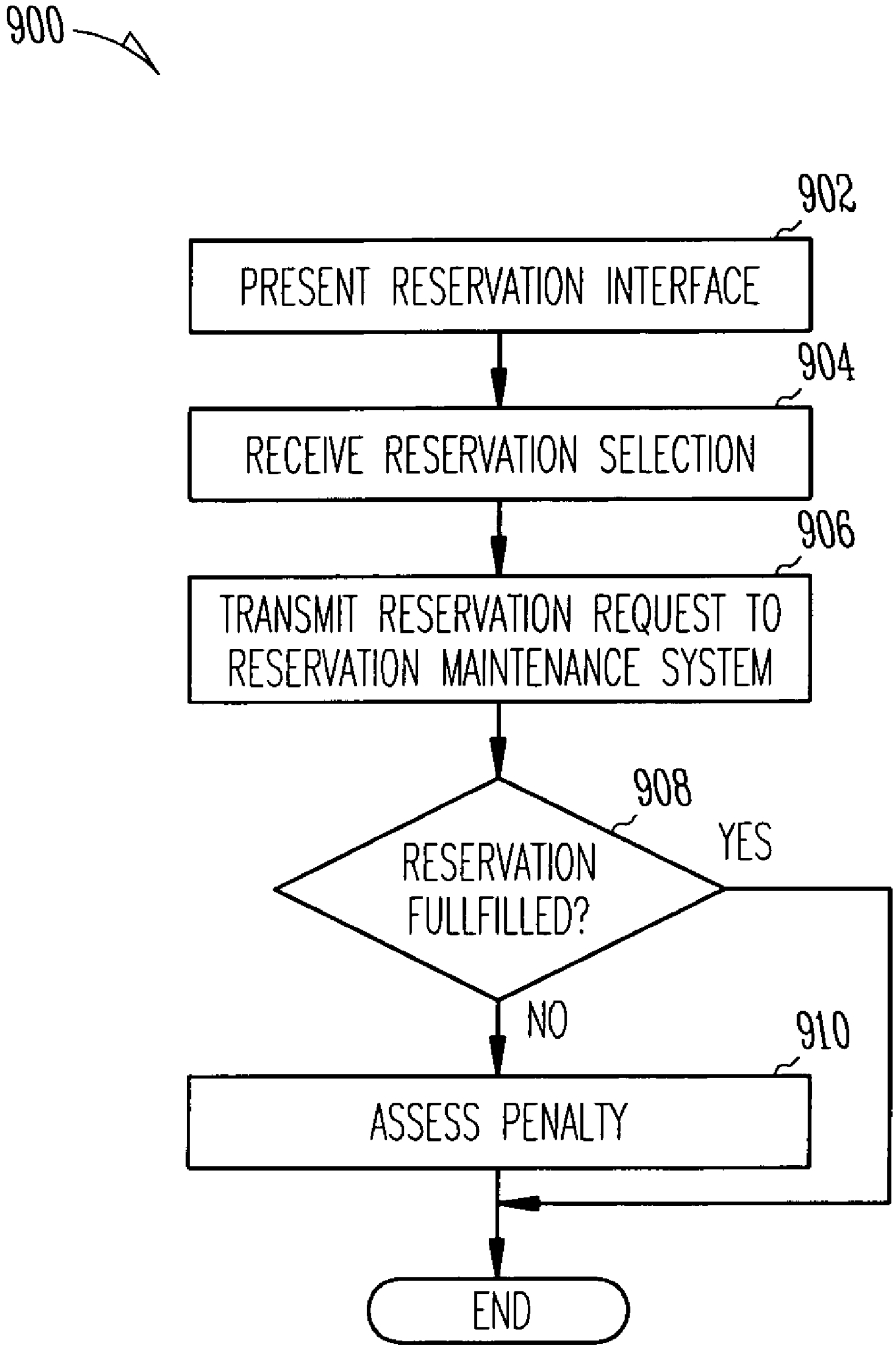
FIG. 9 is a flowchart illustrating a method for reserving a wagering game theme according to alternative embodiments of the invention.

FIG. 9 is a flowchart illustrating a method 900 for reserving a wagering game theme according to embodiments of the invention. The method begins at block 902 by presenting a reservation interface. The reservation interface allows a user to enter information related to reserving a wagering game theme. For example, the interface may provide user interface elements to enter a desired wagering game theme, a time and date and a duration of the reservation (as a time period or as an end time and date). Further, the interface may present a list of themes available for reservation. The list may be dependent on various conditions. For example, the list presented to the user may depend on a loyalty status of the user. In this case, a "gold" status user may be presented with more wagering game themes than a "silver" status user. Additionally, the list presented may depend on a number of reservations that are available for a particular time.

At block 904, the system receives a selection of a wagering game theme to reserve, along with any other data associated with the reservation (time, date, duration etc.)

At block 906, the reservation information may be transmitted to a reservation maintenance system for storage and later use in fulfilling the reservation.

In some embodiments, at block 908 the system checks to see if the reservation was fulfilled, that is, did the user honor a reservation that was previously made by using the reservation within the reservation start and end times. In some embodiments, if the user does not fulfill their reservation, the system assesses a penalty to the user. The penalty may take various forms. For example, the penalty may involve the loss of loyalty points. Alternatively, the penalty may involve restrictions or loss of reservation privileges for a period of time. In some embodiments, the system may defer assessing a penalty until it is determined that the user failed to honor a reservation on multiple occasions.

Figure 10:
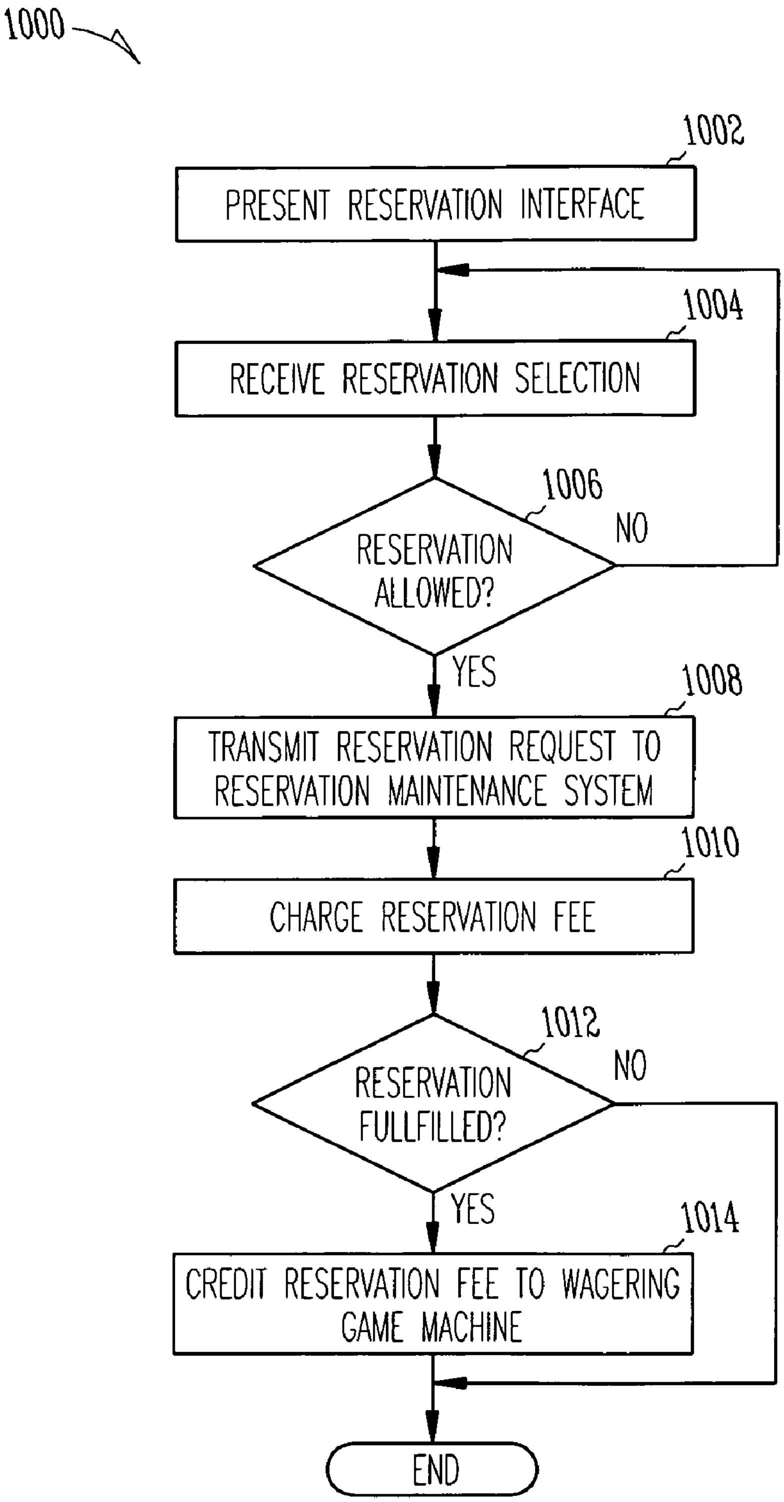
FIG. 10 is a flowchart illustrating a method for reserving a wagering game theme according to further alternative embodiments of the invention.

FIG. 10 is a flowchart illustrating a method 1000 for reserving a wagering game theme according to alternative embodiments of the invention. The method begins at block 1002 by presenting a reservation interface. As with block 802 of FIG. 8, the reservation interface allows a user to enter information related to reserving a wagering game theme. For example, the interface may provide user interface elements to enter a desired wagering game theme, a time and date and a duration of the reservation (as a time period or as an end time and date). Further, the interface may present a list of themes available for reservation. The list may be dependent on various conditions. For example, the list presented to the user may depend on a loyalty status of the user. In this case, a "gold" status user may be presented with more wagering game themes than a "silver" status user. Additionally, the list presented may depend on a number of reservations that are available for a particular time. In some embodiments, a user with sufficient status, such as a "high roller" or a user with a high loyalty status may be able to reserve a wagering game theme regardless of some or all restrictions that may be placed on other users with a lower status or no status.

At block 1004, the system receives a selection of a wagering game theme to reserve, along with any other data associated with the reservation (time, date, duration etc.). There may be a reservation fee or other type of charge associated with the reservation. For example, a certain number of loyalty points may be required in order to make a reservation. Alternatively, a cash fee may be required. Other forms of payment media may be required and are within the scope of the inventive subject matter.

The reservation fee may be fixed of it may vary depending on a variety of conditions. For example, the fee may vary depending on the number of current reservations such that the higher the number of current reservations, the higher the fee. Further, the fee may vary depending on the loyalty status of the user. For example, a user with a high status may pay a small fee or no fee, whereas a user with a lower status may pay a higher fee. Alternatively, the fee may vary depending on the time of day or year, where fees rise during times of higher expected occupancy and lower during times of lower expected occupancy. Additionally, fees may change depending on whether there is a major event (e.g., a show, boxing event etc.) scheduled during the time the reservation is requested. Further, fees may be conditioned on purchase of another item or service. For example, a reservation fee may be lower or not be assessed if the reservation is made in conjunction with purchasing tickets to a show at the casino.

In some embodiments, at block 1006, the system checks to determine if the reservation is allowable. Various reasons may exist why a reservation would not be allowed. For example, all available reservations for a requested time slot may be currently filled. Alternatively, the user may not have a sufficient loyalty status with the gaming establishment. Further, the user may not have sufficient loyalty points in a player tracking account or have sufficient funds in a cashless gaming account, credit card account or other type of account. Still further, the requester may have been penalized for not honoring a previous reservation. If the reservation is not allowed, control returns to block 1004 to allow the user to select a different wagering game theme or to enter different reservation parameters such as a different time period.

If the reservation is allowed, the reservation request is transmitted at block 1008 to a reservation system for entry and storage into the system for later use in fulfilling the reservation. At block 1010, the fee assessed at block 1004, if any, is charged to the user's account.

In some embodiments, at block 1012 the system checks to see if the reservation was fulfilled, that is, did the user honor a reservation that was previously made by using the reservation within the reservation start and end times. In some embodiments, if the user does not fulfill their reservation, the method ends with the user forfeiting any fees that have been previously paid.

If the user does honor the reservation by playing the wagering game having the reserved theme, then in some embodiments, at block 1014 the system provides a credit on the wagering game machine having the theme reserved by the user. The credit may be a one for one credit, e.g., if the user was charged $5.00 for the reservation, the user may receive a $5.00 credit on the wagering game machine upon honoring the reservation. Alternatively, the credit may be a portion of the fee charged. Further, in the case of loyalty points, the user may be credited an amount based on a formula to convert loyalty points to a cash value to be credited to the wagering game machine. Alternatively, the user may be credited with additional loyalty points of receive loyalty points at a rate higher than they otherwise would receive in exchange for honoring their reservation.

Figure 11:
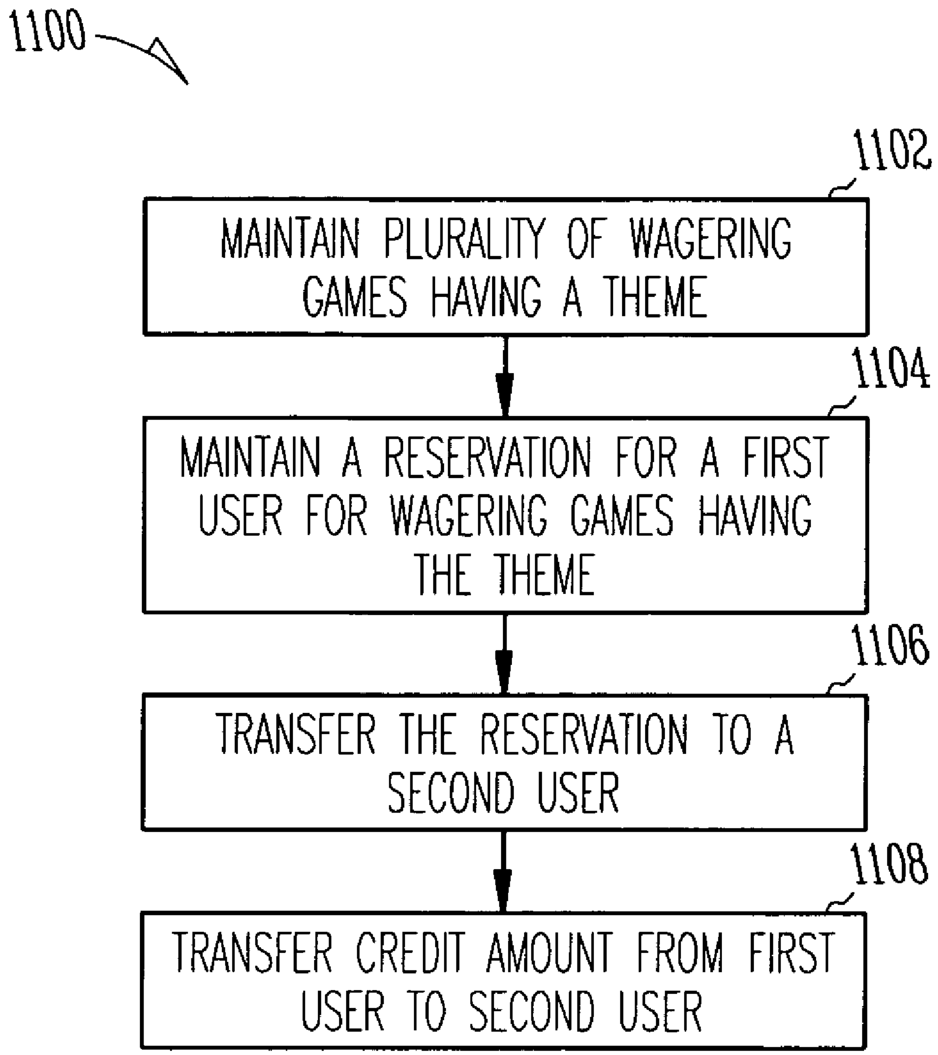
FIG. 11 is a flowchart illustrating a method for transferring a wagering game theme reservation according to embodiments of the invention.
Figure 12:
FIG. 12 provides example screen interfaces according to embodiments of the invention.

FIG. 11 is a flowchart illustrating a method 1100 for transferring a wagering game theme reservation according to embodiments of the invention. The method begins at block 1102 by maintaining a plurality of wagering games having a theme. As discussed above with reference to FIG. 7, the wagering games may be maintained in any of a number of ways. For example, the wagering games may be maintained in a memory such as a RAM, compact flash or hard drive of a wagering game machine. Alternatively, the wagering games may be maintained on a server and downloaded to, or accessed by, wagering game machines. The download may take place on demand, i.e., when the wagering game is accessed, or the download may take place prior to any user's request for the wagering game.

At block 1104, the system maintains a reservation for a wagering game theme for a first user. The user may have made the reservation using any of the methods described above, including user created reservations, administration created reservations, and/or reservations based on the status of a user.

At block 1106, the system transfers the reservation from the first user to a second user. This transfer may be initiated by the first user, who may desire to transfer the reservation to a relative, friend or colleague. The system updates the reservation with the identity or credentials for the second user.

In some embodiments, at block 1108, the system may transfer a credit amount from the second user to the first user in exchange for the reservation transfer. For example, the first user may exchange a wagering game theme reservation for loyalty points, cash, or other medium of exchange. The reservation maintenance system may support a "market" of wagering game theme reservations such that wagering game theme reservations may be exchanged via the market.

The methods above have generally been described in the context of a single user making a reservation for a wagering game theme. In some embodiments of the invention, multiple reservations for a block of wagering game machines having a particular theme may be made by, or on behalf of, a group of players. For example, a user may reserve multiple wagering game machines having a desired theme. The multiple wagering game machines may be located near one another as a block of wagering game machines. Allowing a group reservation is particularly desirable in the case of community based games where multiple players may participate in a single bonus round of a wagering game, each participating from their respective wagering game machine For example, a community based bonus game may be based on a "race" in which each wagering game machine represents a participant in the race. A group of players may desire the opportunity to participate in the same community based game. Embodiments of the invention provide the ability for a group of wagering game machines to be reserved by a group of players, thereby heightening the enjoyment of the wagering game experience for the group.

FIG. 11 illustrates example screen interfaces 1102 and 1104 at wagering game machines according to embodiments of the invention. Example screen 1102 illustrates a screen of a wagering game where having a theme that currently requires a reservation. The user is prompted to provide reservation credentials in order to initiate play of the wagering game. The prompt may be removed and general use of the wagering game theme may be allowed in the case that the number of concurrently executing instances of the wagering game theme falls below the maximum number allowed.

Example screen 1104 provides an example of a user interface for a wagering game machine that allows download and/or selection of multiple wagering game themes. For example, the wagering game machine may provide a portal interface for downloading wagering game themes. In the example shown, several wagering game themes may be selected for execution without requiring a reservation. However, two of the themes, the "Wizard of Oz" theme and the "Monopoly Up Up And Away" theme are indicated as requiring a reservation in order to play the wagering game theme. In the example shown, the indication is provided as text. However, in alternative embodiments, other indicators, such as color, icons, highlighting etc. may be used to indicate that a reservation is required. Further, the indication may be removed dynamically if a reservation is no longer required to execute a wagering game having the desired theme.

GENERAL

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A theme reservation system for reserving one of a first plurality of commonly themed wagering game instances, the game instances of the first plurality having limited availability for activation on a gaming machine, the first plurality being shared for concurrent play among a second plurality of gaming machines, the theme reservation system comprising:

one or more display devices;

one or more input devices;

one or more processors; and one or more memory devices storing instructions that, when executed by at least one of the one or more processors, causes the one or more processors to operate with at least one of the one or more display devices and at least one of the one or more input devices to:

receive, via at least one of the one or more input devices, a request from a player to reserve a currently unavailable game instance of the first plurality;

generate a reservation linked to the player for the requested game instance, the reservation including one or more reservation parameters, wherein the reservation reserves a subsequently available game instance of the first plurality according to the one or more reservation parameters, and wherein the gaming machines of the second plurality are available for game play while the reservation is pending;

activate the reserved game instance at a gaming machine of the second plurality in response to the player accessing the gaming machine while the reserved game instance is available; and display, via at least one of the one or more display devices, the themed wagering game for the player at the gaming machine.

2. The reservation system of claim 1, wherein the reservation system is connected to a communications network, and wherein the instructions further cause the system to notify the player via the communications network when the reserved game instance is available.

3. The reservation system of claim 2, wherein the system notifies the player via one of a mobile telephone and a personal computing device.

4. The reservation system of claim 1, wherein the second plurality of gaming machines includes one of a portable gaming machine, a mobile telephone, and a personal computing device.

5. The reservation system of claim 1, wherein the first plurality of game instances is limited to a maximum number of allowed game instances.

6. The reservation system of claim 5, wherein the maximum number of allowed game instances is determined by one or more licensing agreements.

7. The reservation system of claim 1, wherein one of the one or more reservation parameters includes a queue position for a next available game instance.

8. The reservation system of claim 1, wherein the reservation is linked to the player's identity as determined by one of a player's club card, a player tracking system, and a credit card.

9. The reservation system of claim 1, wherein at east one of the one or more reservation parameters is related to a player status.

10. The reservation system of claim 2, wherein activating the reserved game instance includes receiving the game instance from a wagering game server on the communications network.

11. The reservation system of claim 1, wherein the at least one of the one or more input devices is one of a mobile telephone and a personal computing device.

12. A computer-implemented method for reserving a game instance of a first plurality of commonly themed wagering game instances that are shared for concurrent play among a second plurality of gaming machines, the game instances of the first plurality having limited availability for activation on a gaming machine, each gaming machine of the second plurality being configured to conduct a wagering game and including one or more display devices, the method comprising:

receiving, via one or more input devices, a request from a player to reserve a currently unavailable game instance of the first plurality;

generating, via at least a first processor, a reservation linked to the player for the requested game instance, the reservation including one or more reservation parameters, wherein the reservation reserves a subsequently available game instance of the first plurality according to the one or more reservation parameters, and wherein the gaming machines of the second plurality are available for game play while the reservation is pending;

activating, via at least a second processor, the reserved game instance at a gaming machine of the second plurality in response to the player accessing the gaming machine while the reserved game instance is available; and displaying, via at least one of the one or more display devices, the themed wagering game for the player at the gaming machine.

13. The computer-implemented method of claim 12, wherein the request is received via one of a mobile telephone and a personal computing device.

14. The computer-implemented method of claim 12, wherein the first and second processors are the same processor.

15. The computer-implemented method of claim 12, wherein activating the reserved game instance includes receiving the reserved game instance from a wagering game server on a communications network.

16. The computer-implemented method of claim 12, wherein accessing the gaming machine includes playing a different wagering game on the gaming machine.

17. A gaming system configured to share a first plurality of commonly themed wagering game instances for concurrent play among a second plurality of gaming machines, the game instances of the first plurality having limited availability for activation on a gaming machine, at least one of the second plurality being configured to play two or more different wagering games, the gaming system comprising;

a wagering game server connected to a communications network and storing at least one wagering game corresponding to the first plurality of commonly themed wagering game instances;

one or more display devices;

one or more input devices;

one or more processors; and one or more memory devices storing instructions that, when executed by at least one of the one or more processors, cause the one or more processors to operate with the gaming system to:

receive, via at least one of the one or more input devices, a request from a player to reserve a currently unavailable game instance of the first plurality;

generate a reservation linked to the player for the requested game instance, the reservation including one or more reservation parameters, wherein the reservation reserves a subsequently available game instance of the first plurality according to the one or more reservation parameters, and wherein the player plays a different wagering game at the at least one gaming machine of the second plurality while the reservation is pending;

activate the reserved game instance by receiving an available game instance from the wagering game server at the at least one gaming machine in response to the player accepting the reserved game instance; and display, via at least one of the one or more display devices, the themed wagering game for the player at the at least one gaming machine.

18. The gaming system of claim 17, wherein the reservation is linked to the player's identity as determined by one of a presented player's club card, a player tracking system, and credit card.

19. A machine-readable, non-transitory medium including executable instructions for reserving one of a first plurality of commonly themed wagering game instances, the first plurality being shared for concurrent play among a second plurality of gaming machines, the game instances of the first plurality having limited availability for activation on a gaming machine, each gaming machine of the second plurality including one or more display devices configured to display a wagering game, the instructions, when executed by one or more processors, cause the one or more processors to operate with at least one gaming machine of the second plurality to perform a method comprising:

receiving, via one or more input devices, a request from a player to reserve a currently unavailable game instance of the first plurality;

generating, via at least a first processor, a reservation linked to the player for the requested game instance, the reservation including one or more reservation parameters, wherein the reservation reserves a subsequently available game instance of the first plurality according to the one or more reservation parameters, and wherein the gaming machines of the second plurality are available for game play while the reservation is pending;

activating, via at least a second processor, the reserved instance at a gaming machine of the second plurality in response to the player accessing the gaming machine while the reserved instance is available; and displaying, via at least one of the one or more display devices, the themed wagering game for the player at the gaming machine.

20. The machine-readable medium of claim 19, wherein the medium resides on a reservation server connected to a communications network and receives the request and activates the reserved instance via the communications network.

* * * * *